United States Patent [19]

Weber et al.

[11] Patent Number: 5,106,395
[45] Date of Patent: Apr. 21, 1992

[54] PROCESS FOR AVOIDING A FORMATION OF HIGHLY CONDENSED AROMATIC HYDROCARBONS AND DIOXINES IN COMBUSTION SYSTEM

[75] Inventors: Ekkehard Weber, Essen; Karlheinz Arras, Frankfurt am Main, both of Fed. Rep. of Germany

[73] Assignee: Metallgesellschaft Aktiengesellschaft, Frankfurt am Main, Fed. Rep. of Germany

[21] Appl. No.: 538,253

[22] Filed: Jun. 14, 1990

[30] Foreign Application Priority Data

Jun. 16, 1989 [DE] Fed. Rep. of Germany ....... 3919790

[51] Int. Cl.⁵ ............................................. B01D 46/00
[52] U.S. Cl. ...................................................... 55/1; 55/97
[58] Field of Search ................... 55/1, 97, 302, 523, 55/524

[56] References Cited

U.S. PATENT DOCUMENTS

| 3,535,352 | 10/1970 | Hirs | 55/523 |
|---|---|---|---|
| 4,398,931 | 8/1983 | Shevlin | 55/523 |
| 4,692,176 | 9/1987 | Israelson | 55/523 |
| 4,735,635 | 4/1988 | Israelson et al. | 55/97 |
| 4,735,638 | 4/1988 | Ciliberti et al. | 55/523 |
| 4,812,149 | 3/1989 | Griffin et al. | 55/97 |
| 4,865,627 | 9/1989 | Dewitz et al. | 55/97 |
| 4,903,617 | 2/1990 | Weber et al. | 55/523 |
| 4,912,076 | 5/1990 | Mizrah et al. | 55/523 |
| 4,921,616 | 5/1990 | Minjolle | 55/523 |
| 4,973,458 | 11/1990 | Newby et al. | 55/523 |
| 4,973,459 | 11/1990 | Lippert et al. | 55/523 |

FOREIGN PATENT DOCUMENTS

| 3507303 | 9/1985 | Fed. Rep. of Germany | 55/97 |
|---|---|---|---|
| 3644381 | 7/1988 | Fed. Rep. of Germany | . |
| 3720963 | 1/1989 | Fed. Rep. of Germany | 55/97 |
| 57-165011 | 10/1982 | Japan | 55/523 |

Primary Examiner—Jay H. Woo
Assistant Examiner—C. Scott Bushey
Attorney, Agent, or Firm—Felfe & Lynch

[57] ABSTRACT

A process is described for avoiding the formation of highly condensed aromatic hydrocarbons and dioxines in combustion systems, preferably in garbage incinerating systems, wherein the combustion exhaust gas are dedusted at temperatures from 300° to 1000° C. behind the furnace and wherein said process combustion exhaust gases are dedusted by means of a ceramic filter element which is made of $SiO_2$ and/or $Al_2O_3$ and/or $ZrO_2$ and an inorganic binder and has a porosity of 50 to 90% and an apparatus for carrying out the process is also described.

7 Claims, 1 Drawing Sheet

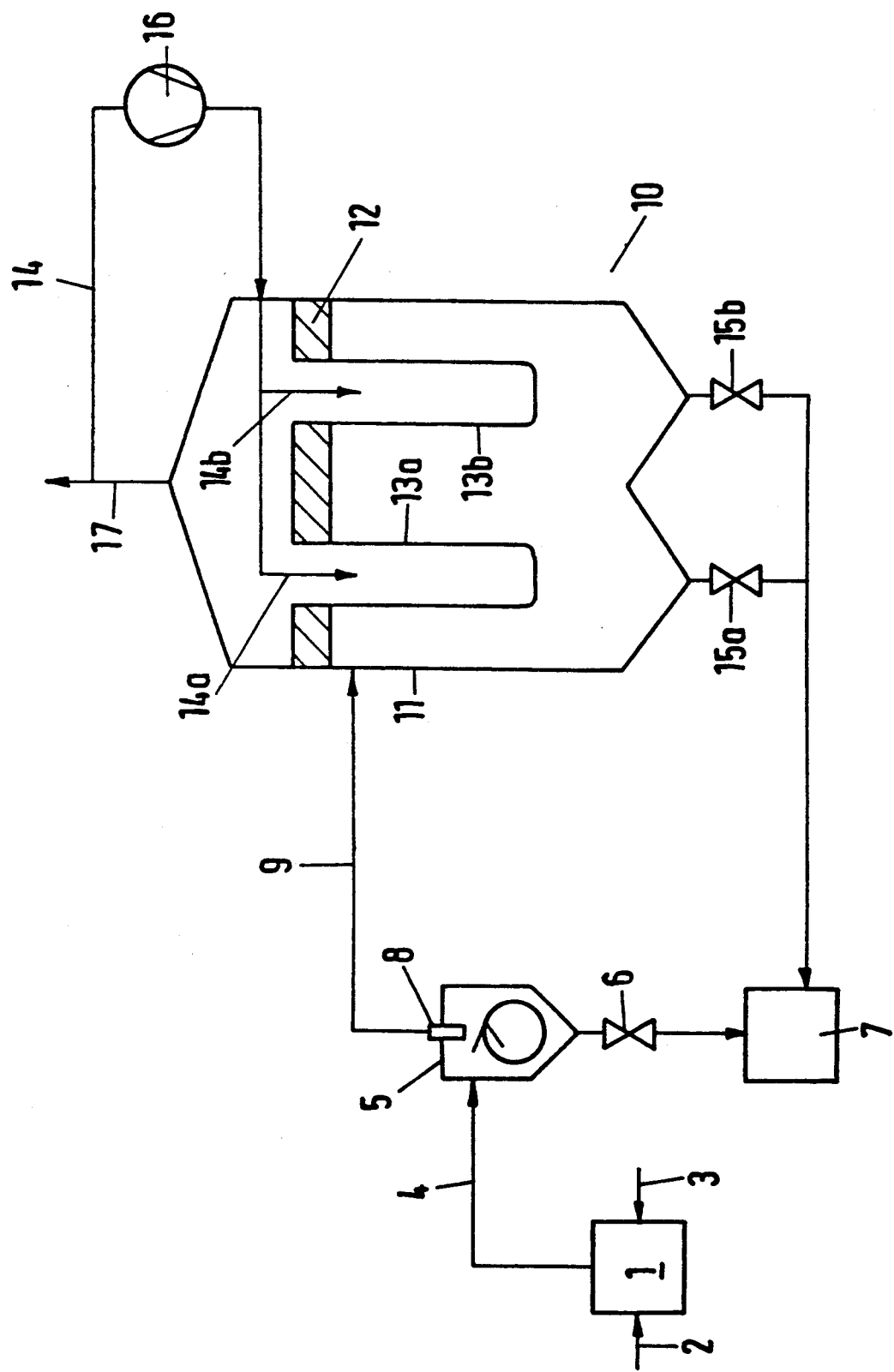

PROCESS FOR AVOIDING A FORMATION OF HIGHLY CONDENSED AROMATIC HYDROCARBONS AND DIOXINES IN COMBUSTION SYSTEM

FIELD OF THE INVENTION

This invention relates to a process for avoiding the formation of highly condensed aromatic hydrocarbons and dioxines in combustion systems, preferably in garbage incinerating systems, wherein the combustion exhaust gases are dedusted at temperatures from 300° C. to 1000° C., preferably from 400° C. to 900° C., after discharge from a furnace. The invention relates also to an apparatus for carrying out the process.

BACKGROUND OF THE INVENTION

It is well known that highly condensed aromatic hydrocarbons and dioxines are formed in combustion processes, particularly in the incineration of garbage, and are discharged from the combustion system together with the filter dust and the exhaust gas. The general term "highly condensed aromatic hydrocarbons" describes multinuclear aromatic compounds, which may also contain one or more OH groups. The general term "dioxines" is used to describe polychlorinated di-benzo-p-di-oxines and polychlorinated dibenzofuranes. The dioxines include a total of 210 isomers, some of which are extremely toxic. The highly condensed aromatic hydrocarbons are also deleterious to health because they are regarded as cancerogenic substances. Owing to the toxicity of highly condensed aromatic hydrocarbons and dioxines, said compounds must be removed from the filter dust and from the exhaust gas or the formation of said compounds in the combustion system must be avoided.

It is known that highly condensed hydrocarbons, which may contain also OH groups, are formed in combustion systems at 300° C. to 400° C.—during the cooling of the exhaust gases—by a recombination of organic radicals in the presence of oxygen. It is also known that dioxines are formed below 300° C. in combustion systems because chlorine is formed from the existing chlorine compounds in the presence of oxygen at higher combustion temperatures and said chlorine will cause the dioxines to be formed in the presence of organic compounds or carbon as the exhaust gases are cooled. That reaction is additionally catalyzed by the heavy metal compounds (oxides) which are contained in the flue dust. For this reason it has already been proposed to separate the flue ash from the exhaust gas stream from combustion systems at temperatures above 300° C. because it is known that highly condensed aromatic hydrocarbons and dioxines are thermally unstable above 600° C.

In accordance with Published German Application 3,644,381, the emission of pollutants from combustion systems is minimized by a process in which the flue gases are dedusted at temperatures of about or above 300° C. immediately upon discharge from the furnace before the heat exchanger or in the first portion of the heat exchanger. The dedusting is affected in a separating nozzle (centrifugal deduster) that is made of ceramic material or in a granular bed filter. The process proposed in Published German Application 3,644,381 is intended to prevent a catalytic formation of dioxines owing to the presence of particles of flue dust in the flue gas as it is cooled.

It has been found that a granular bed filter and a centrifugal deduster cannot dedust the exhaust gas from the combustion to such a degree that a formation of highly condensed aromatic hydrocarbons and dioxines will always be precluded. Investigations have shown that the pure gas from combustion systems in which a dedusting is effected by a granular bed filter and/or a centrifugal deduster will at least temporarily contain dust in excess of 5 mg/sm$^3$ (sm$^3$=standard cubic meter) and that even such low dust contents will be sufficient for a catalytic formation of highly aromatic hydrocarbons and particularly dioxines.

For this reason it is an object of the invention to provide a process by which a formation of highly condensed aromatic hydrocarbons and dioxines in combustion systems will be avoided and which is preferably safe and will reliably prevent a formation of the above-mentioned substances during the cooling of the exhaust gases so that said substances can no longer be detected in the filter dusts and the exhaust gases. It is another object of the invention to provide an apparatus for carrying out the process.

SUMMARY OF THE INVENTION

The object of the present invention is accomplished by dedusting combustion exhaust gases by means of a ceramic filter element which is made of $SiO_2$ and/or $Al_2O_3$ and/or $ZrO_2$ and an inorganic binder, and wherein the filter has a porosity of 50 to 90%. The ceramic filter element may consist of a sintered member, a woven fabric or a felt. The use of such filter elements ensures that the residual dust content of the pure gas will be less than 2 mg/sm$^3$. That dust content will be too low for the reliable catalytic formation of highly condensed aromatic hydrocarbons and dioxines during the cooling of the pure gas. As a result of employing such a filter element, the above-mentioned substances are no longer detectable in the dusts which had been collected in accordance with the process of the present invention and the pure gas had also been found to not contain such compounds.

DETAILED DESCRIPTION OF THE INVENTION

The process in accordance with the invention can be carried out with particularly good success if the filter element has a thickness of 10 mm to 30 mm; the pressure drop across the filter elements amounts to 500 to 1000 millibars; and the filter element comprises fibers which have been compacted together with the inorganic binder to form a felt. By means of such filter elements, a pure gas having a residual dust content below 1 mg/sm$^3$ can be obtained.

In accordance with an optional feature of the invention the filter element comprises 30% to 70% by weight $Al_2O_3$, 15% to 50% by weight $SiO_2$ and 1% to 10% by weight inorganic binder. Preferred inorganic binders include alkali metal silicates, alkaline earth metal silicates, alkali metal phosphates and alkaline earth metal phosphates. Filter elements having that composition will be particularly reliable in operation at 600° C. to 1000° C.

Within the scope of the invention the filter element may be cleaned by backpurging or by pulsing with a gas when the temperature at the filter element is between 300° C. and 900° C. For backpurging, a group of filter elements are decoupled from the filtration process and are backpurged with a gas stream so that the dust that has been collected by the filter will be detached therefrom. During pulsing, at least one filter element is subjected to a gas pressure pulse acting in a direction which is opposite to the direction of flow of the gas to be filtered element.

Within the scope of the invention it will be particularly desirable to cool the dust which has been removed in a closed vessel in the absence of air. The measures described hereinbefore will ensure that highly condensed aromatic hydrocarbons and dioxines will not be formed also during backpurging and during the removal of dust from the filter element.

The object underlying the invention is also accomplished by providing an apparatus which comprises a housing and a plurality of self-supporting filter elements, which are secured in a plate and consist of filter tubes. At least one of the plates which are provided with filter tubes is disposed in a housing and the filter tubes are so arranged in the dust-containing exhaust gas stream that the filter tubes will be flown through by the gas from the outside to the inside. The use of a plurality of filter tubes will afford the advantage that a group of such tubes can be cleaned by backpurging and/or pulsing while the dedusting by the other filter tubes need not be interrupted. The plates in which the filter tues are mounted consist of steel or of a ceramic material. If the various materials have different coefficients of a expansion, these differences will be taken up by suitable gaskets. By means of the apparatus in accordance with the invention the pure gas side and the raw gas side can reliably be separated from each other.

In accordance with an optional feature of the invention a cyclone, which is optionally lined with ceramic material, is provided between the furnace and the filter element. It has been found that such an arrangement will be particularly desirable when large amounts of dust must be removed from the combustion exhaust gases because the cyclone will ensure a sufficiently high dedusting rate so that the load on the filter element will be decreased and the filter element can be operated for a longer interval of time before cleaning is required.

DETAILED DESCRIPTION OF PREFERRED EMBODIMENTS

The subject matter of the invention will now be explained in more detail with reference to the drawing, in which the apparatus for carrying out the process in accordance with the invention is diagrammatically shown.

The garbage which has been supplied to a furnace chamber 1 by a feeder 2 is combusted at 850° C. to 1000° C. with air that is supplied in said furnace chamber 1 in line 3. The dust-containing hot combustion exhaust gases flow through the flue 4 into a cyclone 5, which constitutes a centrifugal deduster and is lined with a refractory ceramic material. The dust which has been collected in the cyclone 5 is discharged via line 6 to the dust bin 7 and is cooled therein in the absence of air. The prededusted exhaust gas leaves the cyclone 5 through the depending tube 8 and the exhaust gas line 9 and enters the dedusting filter 10.

The dedusting filter 10 comprises a heat-insulated housing 11, which contains a plate 12 and is made of a ceramic material or steel and separates the raw gas side from the pure gas side. A plurality of filter tubes 13a, 13b are gastightly mounted in the plate 12. The filter tubes are self-supporting and comprise ceramic fibers, which together with an inorganic binder have been compacted to form a felt. The filter tubes will not be deteriorated by a long-term operation at temperatures from 600° C. to 1000° C. Instead of a felt of ceramic fibers, a sintered ceramic material may be used to make the filter tubes.

The prededusted combustion exhaust gas at a temperature from 850° C. to 950° C. flows through the filter tubes 13a, 13b from the outside to the inside so that the dust will be retained on the outside surface of the filter tubes. After regular intervals of time, at least one filter tube or a group of filter tubes is or are cleaned by backpurging or pulsing. The cleaning gas is supplied through lines 14a, 14b to the interior of the filter tube and detaches the dust cake which has formed on the outside surface of the filter tube. This dust is delivered to the dust bin 7 by way of the funnel shaped bottom of the housing 11 and lines 15a and 15b and is cooled therein in the absence of air. The filter tubes 13a, 13b are preferably cleaned by means of dedusted exhaust gas, which is taken from the pure gas stream and is compressed by the compressor 16 to the required operating pressure. The dust content of the dedusted combustion exhaust gas is always maintained below 1 mg/sm$^3$ and will not exceed that limit even for a short time. The dedusted hot combustion exhaust gas flows through the pure gas duct 17 to a heat exchanger (steam generator), which is not shown on the drawing.

Part of the heat which is contained in the combustion exhaust gas may be dissipated before the dedusting filter 10 so that dedusting will be effected at a temperature of, e.g., 600° C. to 700° C. For instance, heat exchanger tubes may be provided in the cyclone 6.

During a period of 6 months it has not been possible to detect highly condensed aromatic hydrocarbons and dioxines in the dust which is obtained in the dust bin 7 and in the pure gas that is discharged into the atmosphere. During that period the performance of the filter elements 13a, 13b had not changed.

What is claimed is:

1. A process for avoiding the formation of highly condensed aromatic hydrocarbons and dioxines in a combustion system wherein furnace combustion exhaust gases are dedusted of materials capable of aiding the formation of said highly condensed aromatic hydrocarbons and dioxines at temperatures from 300° C. to 1000° C. by means of a ceramic filter element which is made of a compound selected from the group consisting of $SiO_2$, $Al_2O_3$ and $ZnO_2$ and an inorganic binder and has a porosity of 50% to 90%.

2. The process of claim 1, wherein the exhaust gases are dedusted at temperatures from 400° C. to 900° C.

3. The process of claim 1, wherein the filter element has a thickness of 10 mm to 30 mm; a pressure drop across the filter element amounting to 500 to 1000 millibars; and wherein the filter element comprises fibers which have been compacted together with an inorganic binder to form a felt.

4. The process of claim 2 wherein the filter element has a thickness of 10 mm to 30 mm; a pressure drop across the filter element amounting to 500 to 1000 millibars; and wherein the filter element comprises fibers which have been compacted together with an inorganic binder to form a felt.

5. A process according to claims 1, 2, 3 or 4 wherein the filter element comprises 30% to 70% by weight $Al_2O_3$, 15% to 50% by weight $SiO_2$ and 1% to 10% by weight inorganic binder.

6. The process of claim 5 wherein the filter element is cleaned by a method selected from the group consisting of backpurging and pulsing with a gas when the temperature at the filter element is between 300° C. and 900° C.

7. The process of claim 6 wherein the dust which has been removed from the filter element is cooled in a closed vessel in the absence of air.

* * * * *